(12) United States Patent
Hastings et al.

(10) Patent No.: US 6,976,359 B2
(45) Date of Patent: Dec. 20, 2005

(54) WASTEGATE FOR A TURBOCHARGED INTERNAL COMBUSTION ENGINE

(75) Inventors: Michal Aaron Hastings, Simi Valley, CA (US); Bradley Dean Lewis, Moorpark, CA (US)

(73) Assignee: Turbonetics, Inc., Simi Valley, CA (US)

( * ) Notice: Subject to any disclaimer, the term of this patent is extended or adjusted under 35 U.S.C. 154(b) by 0 days.

(21) Appl. No.: 10/779,942

(22) Filed: Feb. 17, 2004

(65) Prior Publication Data

US 2005/0178122 A1   Aug. 18, 2005

(51) Int. Cl.[7] .......................... F02D 23/00; F16K 1/16
(52) U.S. Cl. ........................................ 60/602; 251/298
(58) Field of Search .................... 60/602; 251/298, 251/61

(56) References Cited

U.S. PATENT DOCUMENTS

| | | | |
|---|---|---|---|
| 3,119,594 A | * | 1/1964 | Heggem ..................... 251/298 |
| 3,334,858 A | * | 8/1967 | Hay ........................... 251/298 |
| 4,174,091 A | * | 11/1979 | Donahue et al. ............ 251/298 |
| 4,377,070 A | | 3/1983 | Shadbourne .................. 60/602 |
| 4,490,622 A | | 12/1984 | Osborn |
| 4,544,326 A | | 10/1985 | Nishiguchi et al. ........... 60/602 |
| 4,637,210 A | * | 1/1987 | Yamamoto .................... 60/602 |
| 4,907,952 A | | 3/1990 | Inoue et al. |
| 5,501,427 A | * | 3/1996 | Ando .......................... 251/298 |
| 6,499,299 B2 | | 12/2002 | Propernick ................... 60/602 |

* cited by examiner

*Primary Examiner*—Thai-Ba Trieu

(57) ABSTRACT

A wastegate valve for a turbocharger that is separate from the turbocharger has an actuator mounted to a valve housing. The valve housing has a passage therethrough and a swing valve that opens and closes the passage. The swing valve has a pivot point that lies outside the path of the exhaust gases. The passage has a recess therein that receives a portion of the swing valve in its open position to improve the flow of exhaust gases through the passage. In an internal combustion engine system, the wastegate valve forms part of a bypass conduit that redirects a portion of the exhaust gases from an engine away from and past the turbocharger.

12 Claims, 4 Drawing Sheets

WASTEGATE FOR A TURBOCHARGED INTERNAL COMBUSTION ENGINE

FIELD OF THE INVENTION

The present invention relates to turbochargers that supply relatively high pressure charge air to the intake of an internal combustion engine. More particularly, the present invention relates to a remote wastegate valve for a turbocharged internal combustion engine.

BACKGROUND OF THE INVENTION

Turbochargers enable the delivery of higher density fuel-air mixtures to one or more combustion chambers or cylinders of an engine in comparison to conventional naturally aspirated engines. An increase in the density of the fuel-air mixture generally improves engine performance and efficiency.

A turbocharger typically includes a turbine wheel and a compressor wheel connected to a common shaft and supported in respective housings (the respective wheels, housings and associated components generally are referred to collectively as the "turbine" and the "compressor", respectively). The turbine housing includes an exhaust gas inlet and outlet. The inlet couples an exhaust gas conduit of an internal combustion engine to the turbine. The exhaust gas conduit directs exhaust gases from the engine through the turbine housing to rotatably drive the turbine wheel. In turn, the turbine wheel rotatably drives the compressor wheel. The compressor wheel compresses ambient air as the wheel rotates and supplies the resultant compressed charge air through an intake conduit to the engine. In a vehicle application, the exhaust gas outlet of the turbine housing typically is coupled to an exhaust system which may further include pollution and/or noise abatement equipment.

Many turbochargers can deliver charge air from the compressor to the engine at a maximum pressure or boost pressure substantially greater than the engine or the turbocharger can withstand at full load operating conditions. Accordingly, a variety of valves and other pressure control devices have been proposed to limit the maximum boost pressure of the charge air.

Controlled valve arrangements can bleed off a portion of the compressed charge air, or open a bypass flow path around the turbine wheel to reduce the amount of exhaust gases driving the turbine wheel. A wastegate valve, sometimes referred to simply as a "wastegate," opens and closes to control the flow of exhaust gases through the bypass. Consequently, controlled operation of the wastegate limits the maximum rotational speed of the turbine wheel and the maximum pressure of the charge air supplied to the engine.

Wastegate valve arrangements typically include a control actuator responsive to engine or turbocharger parameters to control opening and closing of the wastegate valve. These control actuators are available in a variety of specific constructions and can be made responsive to any of a selected number or combination of parameters, such as compressor inlet pressure, compressor discharge pressure, turbine inlet pressure or the like.

Some turbochargers include an integral wastegate valve internal to the turbine housing. Turbine designers typically try to optimize the flow of exhaust gases through a turbine housing to maximize the efficiency of the flow of the exhaust gases through the turbine housing to drive the turbine wheel. Forming an integral wastegate valve in the turbine housing introduces further complexity, cost and durability concerns into the design of the turbocharger. Part of the cost increase comes from the need to analyze the effect of the flow of exhaust gases through the bypass when the wastegate valve is open as well as the effect on the flow of exhaust gases when the wastegate is closed. Retrofitting an existing turbocharger to include an internal wastegate generally is impractical or impossible.

Using a remote, external wastegate valve generally improves the performance of a turbocharger that possesses either an integral internal wastegate, an inadequate wastegate or no wastegate at all. Typically, a remote wastegate includes an actuator and either a butterfly valve or a poppet valve to control the flow of exhaust gases. When the remote wastegate valve is opened, exhaust gases from the engine enter the bypass conduit upstream of the turbocharger and exit the system without driving the turbine. Unfortunately, even in the open position these valves remain in the path of the exhaust gas flow and hinder the flow of exhaust gases through the wastegate valve, thus reducing engine efficiency.

SUMMARY OF THE INVENTION

The present invention provides a remote wastegate valve for use with a turbocharger and an internal combustion engine. An exemplary remote wastegate valve provided by the present invention has a swing gate pivotally mounted to move between an open position that allows the flow of exhaust gases through the wastegate and a closed position that blocks passage of the exhaust gases therethrough. In the open position, a recess in the passage through the housing of the wastegate receives at least a part of the swing gate to maintain a constant cross-sectional area throughout the passage so that the flow of exhaust gases through the wastegate valve may be free and unencumbered.

In an exemplary embodiment, the passage forms a ninety-degree bend between the inlet and the outlet of the wastegate, with the wastegate actuator typically aligned with the inlet. In the open position, the swing gate directs the exhaust gases through the ninety-degree bend. In other embodiments, the actuator may be inclined relative to the inlet or outlet directions. The passage may be straight or offset or form an angle between zero and ninety degrees between the inlet and the outlet.

In contrast to a wastegate that is integral to a turbine housing, the remote wastegate advantageously can be removed and replaced without removing the turbocharger, can be disassembled which makes repairs easier, its performance can be adjusted easily, and generally a remote wastegate generally is more sensitive to "controlling" signals.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

Figure 1:
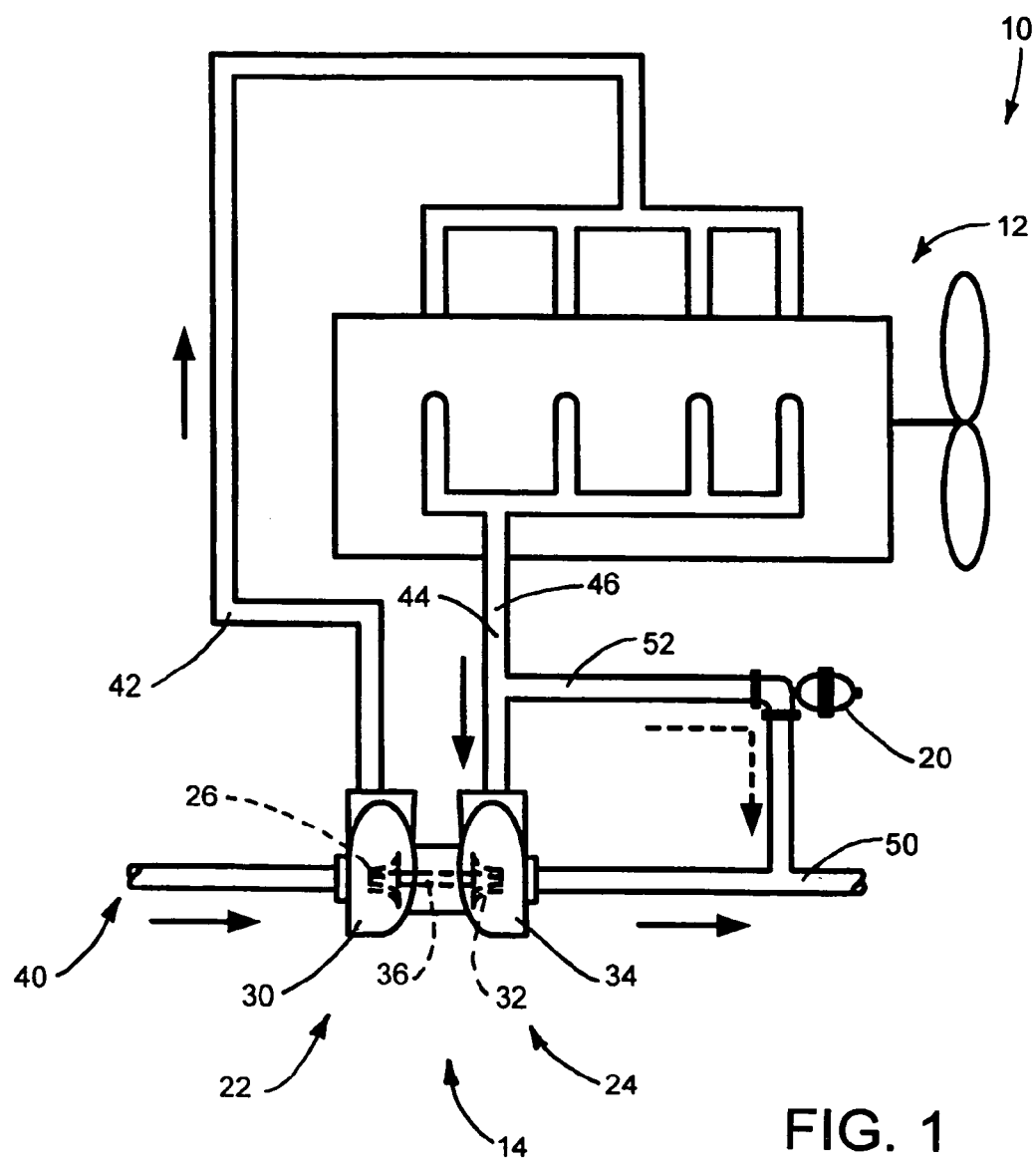
FIG. 1 is a schematic illustration of an internal combustion system that includes a turbocharger and a remote wastegate in accordance with the present invention.

The present invention provides a turbocharged internal combustion engine system 10 as shown in FIG. 1. The system 10 generally includes an internal combustion engine 12 such as a gasoline-powered engine or a diesel-powered engine having one or more combustion cylinders (not shown), one or more turbochargers 14 and one or more improved remote wastegate valves or wastegates 20. Respective sections of conduit interconnect the components of the system.

The turbocharger 14 includes a compressor 22 and a turbine 24. The compressor 22 includes a compressor wheel 26 in a compressor housing 30, and the turbine 24 includes a turbine wheel 32 in a turbine housing 34. A common shaft 36 connects the compressor wheel 26 to the turbine wheel 32 for mutual rotation. The compressor wheel 26 compresses air for combustion in the engine 12 and the turbine wheel 32 drives the compressor wheel 26 using exhaust gases from the combustion in the engine 12.

In operation, ambient air drawn through an air inlet or intake 40 enters the compressor 22. The compressor wheel 26 compresses the air to provide pressurized charge air to the engine 12 via an air intake conduit 42. The air intake conduit 42 may include an intake manifold, an intercooler, or other devices between the air intake 40 and the engine 12. The engine 12 discharges the exhaust gases through an exhaust conduit.

The exhaust conduit 44 includes an upstream exhaust conduit 46 interconnecting the engine 12 and an inlet of the turbine housing 34 that may include an exhaust manifold. The exhaust conduit 44 also includes a downstream exhaust conduit 50 connected to an outlet of the turbine housing, and a bypass conduit or bypass 52 outside the turbine housing 34 that provides a shortcut for exhaust gases from the upstream exhaust conduit 46 to the downstream exhaust conduit 50, bypassing the turbine 24. The downstream exhaust conduit 50 may include one or more pieces of pollution or noise abatement equipment (not shown). The exhaust gases supplied to the turbine 24 rotatably drive the turbine wheel 32 at a relatively high rotational speed and correspondingly drive the compressor wheel 26. The turbine 24 discharges the exhaust gases through the downstream exhaust conduit 50.

Exhaust gases flowing through the bypass 52, on the other hand, do not drive the turbine wheel 32. Therefore, diverting some of the exhaust gases through the bypass 52 partially short-circuits the turbine 24 thereby controlling the rotational speed of the turbine wheel 32. Reducing the speed of the turbine wheel 32 in turn reduces the speed of the compressor wheel 26 and reduces the pressure at the outlet of the compressor 22.

The wastegate valve 20, remotely located relative to the turbocharger 14, controllably opens and closes the bypass 52 to control the flow of exhaust gases to the turbocharger 14. When the wastegate valve 20 closes the bypass 52, all of the engine exhaust gases pass through the turbine 24 in driving communication with the turbine wheel 32 to allow the compressor 22 to compress the charge air to a substantial boost pressure. When the wastegate valve 20 opens the bypass 52, a portion of the engine exhaust gases bypass the turbine 24, effectively limiting the ability of the compressor 22 to develop substantial charge air boost pressure. Consequently, opening and closing the wastegate valve 20 can regulate the speed of the compressor 22 and so control boost pressure at the outlet of the compressor 22.

Figure 2:
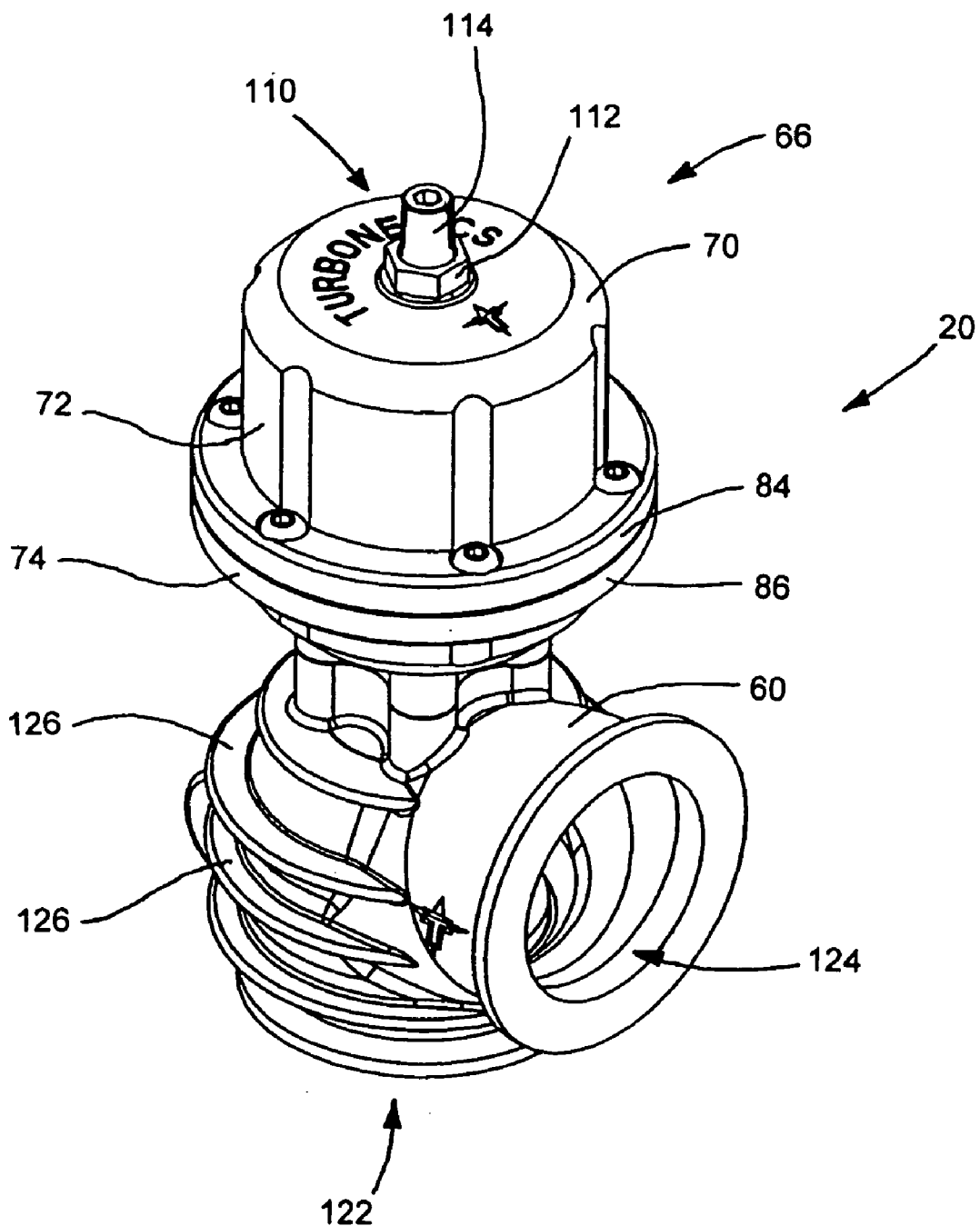
FIG. 2 is a perspective view of an exemplary wastegate provided by the present invention.
Figure 3:
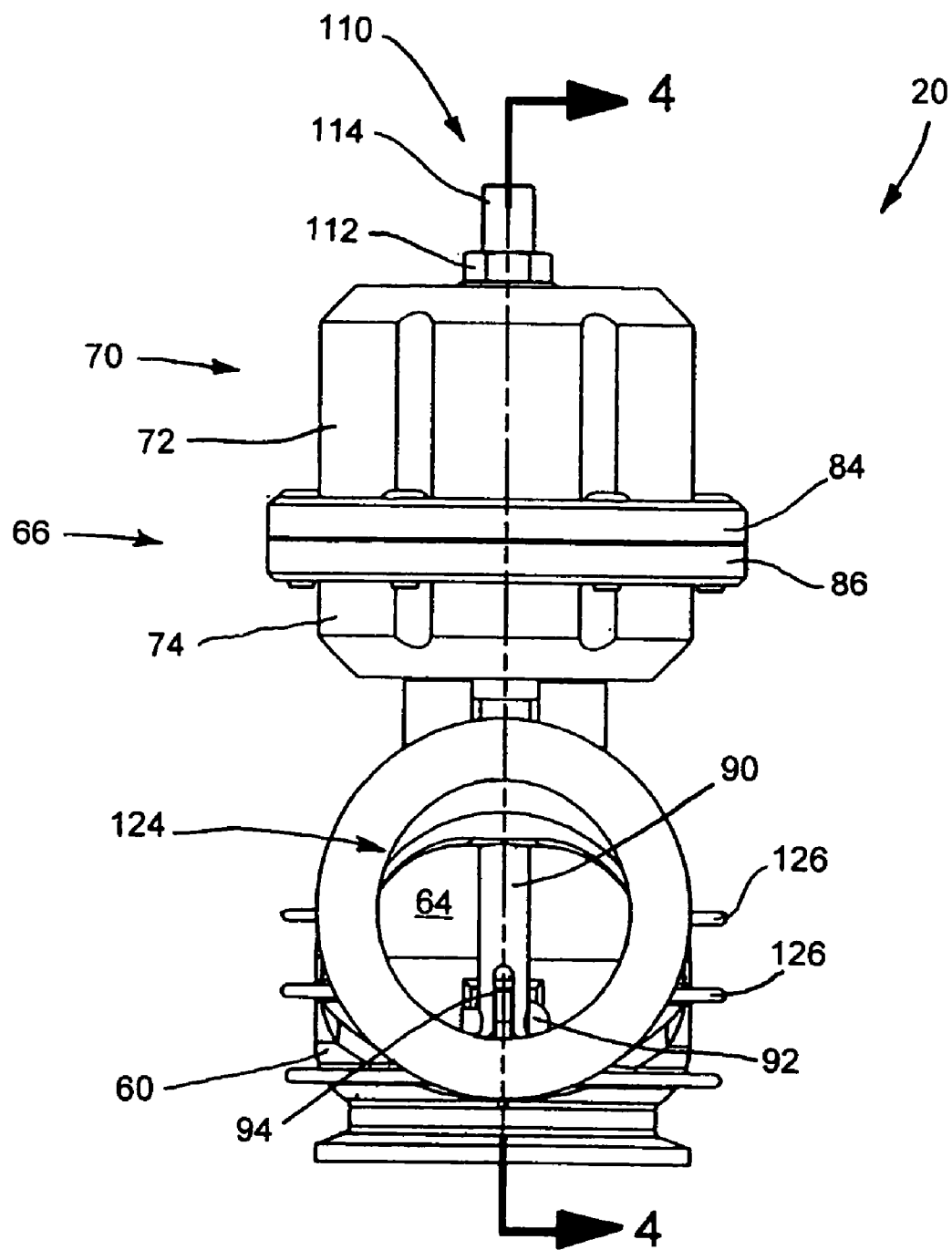
FIG. 3 is a front view of the wastegate shown in FIG. 2.
Figure 4:
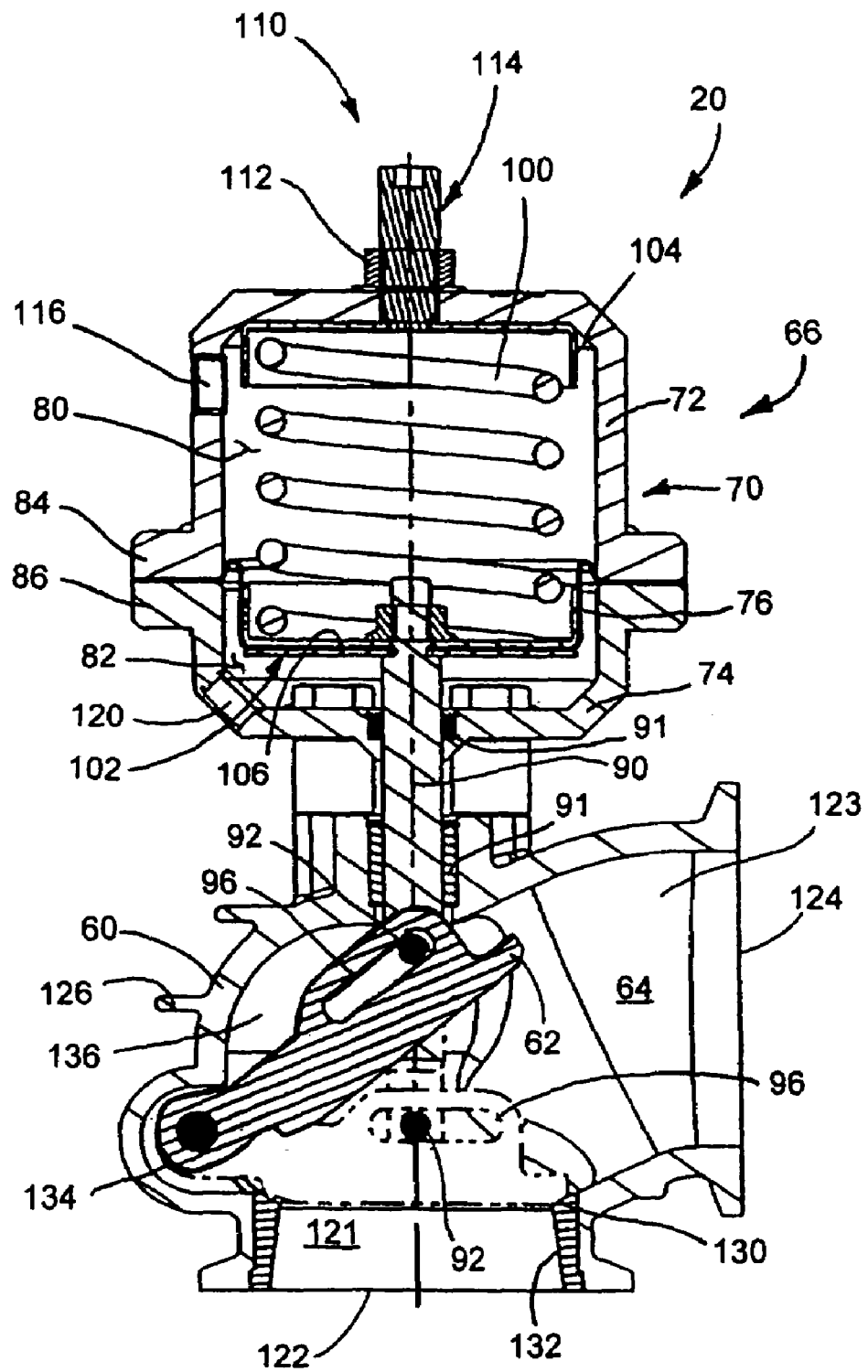
FIG. 4 is a cross-sectional side view of the wastegate shown in FIG. 3 viewed along lines 4—4, showing the valve in an open position in solid lines and in a closed position in phantom lines.

FIGS. 2–4 show an exemplary remote wastegate valve 20. The wastegate valve 20 includes a valve housing 60 that houses a swing gate 62 for opening and closing a passage 64 through the valve housing 60, and a control actuator 66 connected to the valve housing 60 to control the swing gate 62. The actuator 66 operates in response to one or more engine or turbocharger operating conditions. For example, the actuator 66 may control the swing gate 62 based on the boost pressure at the outlet of the compressor 22. Under a low boost pressure, the actuator 66 moves the swing gate 62 into its closed position, closing the bypass 52 to the exhaust gas and sending all of the exhaust gas to the turbine 24. Under an undesirably large boost pressure, however, the actuator 66 moves the swing gate 62 to its open position, opening the bypass 52 to allow at least a portion of the exhaust gases to slow the turbocharger 14 and reduce the boost pressure.

The illustrated control actuator 66 includes an actuator housing 70 formed from upper and lower complimentary housing halves 72 and 74, respectively. The lower housing half 74 of the actuator 66 bolts to the valve housing 60. The housing halves 72 and 74 sealingly secure therebetween the periphery of a resilient diaphragm 76 that divides the housing 70 into an upper chamber 80 and a lower chamber 82 (so-called due to the orientation in the attached figures: however, the wastegate 20 is not limited to the illustrated orientation). The upper and lower housing halves 72 and 74 have outwardly radiating flanges 84 and 86, respectively, that receive the periphery of the diaphragm 76 therebetween. The upper flange 84 bolts to the lower flange 86 to form the actuator housing 70 with the diaphragm 76 mounted therein.

The actuator 66 interacts with the swing gate 62 in the valve housing 60 via an actuator control rod 90 centrally connected to the diaphragm 76. The actuator rod 90 passes through an opening in the lower housing half 74 and an opening in the valve housing 60 to engage the swing gate 62. Seals 91 around the actuator rod 90 inhibit or prevent exhaust gases from leaking from the valve housing 60 into the actuator housing 70. The actuator rod 90 has a transverse pin 92 in a notch 94 at a distal end of the rod 90 that engages the swing gate 62. The pin 92 slides within a slot 96 in the swing gate 62 as the actuator rod 90 moves axially up and down. Movement of the diaphragm 76 thus moves the actuator rod 90 which in turn moves the swing gate 62 between its open and closed positions.

A compression spring 100 mounted in the upper chamber 80 of the actuator housing 70 urges the diaphragm 76 downward in the orientation shown in the figures, and so urge the actuator rod 90 downward to bias the swing gate 62 to the closed position. A rigid washer 102 interposed between the actuator rod 90 and the diaphragm 76 protects the lower surface of the diaphragm 76 from the upper end of the actuator rod 90 on which the diaphragm 76 acts. The compression spring 100 extends between an adjustable-position upper spring seat 104 and a lower spring seat 106 mounted to the diaphragm 76. The lower spring seat 106 mounts on an upper surface of the diaphragm 76 opposite the washer 102.

A tension adjustment mechanism 110 adjusts the position of the upper spring seat 104 relative to the upper housing half 72 to adjust the spring force against which the diaphragm 76 acts. The tension adjustment mechanism 110 includes a nut 112 and a spring pre-load screw 114 that passes through the nut 112 and into an opening in the upper housing half 72. The spring pre-load screw 114 is mounted to the upper spring seat 104 such that turning the pre-load screw 114 moves the upper spring seat 104 in a direction parallel to the axis of the screw 114.

An upper port 116 opening in the upper housing half 72 opens into the upper chamber 80 of the actuator housing 70, and a lower port 120 in the lower housing half 74 opens into the lower chamber 82 of the actuator housing 70. The upper and/or lower port(s) 116/120 relay a variable control pressure to the upper and/or lower chamber(s) 80/82 of the actuator housing 70, respectively, via a control line (not shown), made of tubing, for example. Typically either a pressure signal is provided to the lower chamber 82 opposite the spring 100 or a vacuum signal is provided to the upper chamber 80, and the other chamber left open to atmospheric pressure. For example, the control line may include a control valve and a manifold switch (not shown). The control valve and the manifold switch generally are conventional in construction and may be controlled either pneumatically or electrically. Accordingly, no specific construction details for the switch or the control valve are described herein.

In operation, the manifold switch couples the air inlet side of the compressor 22 to the upper chamber 80 of the actuator 66 via a control valve input. Pressure at the compressor air inlet 40 is sub-atmospheric, and tends to draw the diaphragm 76 upward within the actuator housing 70 as shown. During engine operation under partial load, such as a relatively steady state condition, vacuum within the upper chamber 80 overcomes the bias of the spring 100 to lift the actuator rod 90 upwardly and thereby move the swing gate 62 to an open position. In the exemplary embodiment shown, the actuator 66 moves the swing gate 62 from the closed position in response to a predetermined pressure control signal, such as approximately seven pounds per square inch (7 psi, approximately 48 kPa). In this manner the actuator 66 opens the bypass 52 flow path and dumps a portion of the exhaust gases from the upstream exhaust conduit 46 to the downstream exhaust conduit 50 downstream of the turbine 24. Thus, opening the bypass 52 diverts a portion of the exhaust gases from the turbine housing 34 and the turbine wheel 32.

Turning now from the control actuator 66 to the valve housing 60, the valve housing 60 typically is metal, such as stainless steel, and includes radiating fins 126 that disperse heat from the exhaust gases to protect the seals 91 around the actuator control rod 90 and the diaphragm 76 by preventing or minimizing the heat reaching the seals 91 and the diaphragm 76. The valve housing 60 defines the passage 64 that the swing gate 62 opens and closes in response to the pressure control signal driving the control actuator 66. The passage 64 in the valve housing 60 defines a path for the flow of exhaust gases from an inlet leg 121 at an inlet end 122 of the passage to an outlet leg 123 at an outlet end 124 of the passage. In the illustrated embodiment, the inlet leg 121 of the passage extends parallel to the axis of the actuator rod 90, and the outlet leg 123 of the passage extends perpendicular to the inlet leg 121 of the passage. Thus the passage 64 bends ninety degrees between the inlet and outlet ends 122 and 124 of the passage. When in the fully open position, the swing gate 62 is at an angle of approximately forty-five degrees relative to both the inlet and outlet ends 122 and 124 of the passage.

The swing gate 62 has a beveled surface that provides a sealing surface that mates with a corresponding sealing surface 130 of a bushing 132 when the swing gate 62 is in its closed position. The bushing 132 is mounted in the inlet end 122 of the passage 64 through the valve housing 60. The bushing 132 defines the upstream or inlet end 122 of the passage 64. In the illustrated embodiment, the bushing 132 is a separate and removable component that presses into place in the passage 64 and serves the function of mating with the swing gate 62 to prevent or minimize exhaust gases entering the passage 64. The bushing 132 is removed and replaced easily if the seal is inadequate. An inlet end of the bushing 132 adjacent the inlet end 122 of the passage 64 provides a ring seal between the wastegate 20 and a mating flange on the adjacent section of the bypass conduit 52 (FIG. 1).

The valve housing 60 also has a recess 136 opening onto the passage 64. A pivot pin 134 is mounted to the valve housing 64 in the recess 136 and outside the flow path. The pivot pin 134 supports the swing gate 62 thereon for movement between the closed position that blocks the flow of exhaust gases through the passage 64 and the open position that allows the flow of exhaust gases through the passage 64.

When the actuator rod 90 moves the swing gate 62 to the open position, the recess 136 receives at least a portion of the swing gate 62, thereby providing a clear and unrestricted flow path for the exhaust gases through the wastegate valve 20. With the swing gate 62 in the open position, the cross-sectional area of the flow path through the valve housing 60 is approximately constant. The open swing gate 62 directs the exhaust gases around the ninety degree bend. Unlike the prior butterfly and poppet valve wastegates whose components generally create a restriction in the flow path in the open condition, the remote wastegate valve 20 provided by the present invention provides an unrestricted, constant cross-section flow path through the passage 64 in the valve housing 60. Improving the flow of exhaust gases through the bypass improves the efficiency of the turbocharger system overall.

Although the illustrated valve housing 60 forms a ninety-degree bend between the inlet end 122 of the passage 64 and the outlet end 124 of the passage 64, other angles would be suitable as well. For example, the valve housing may define a straight passage between the inlet end and the outlet end, the valve housing may define a passage having parallel but offset inlet and outlet legs, or the valve housing may define a non-zero, non-ninety-degree angle between the inlet and the outlet ends. In addition, the actuator rod may be aligned with either the inlet leg or the outlet leg of the passage, or the actuator rod may be inclined relative to the inlet leg or the outlet leg of the passage.

Although the invention has been shown and described with respect to an illustrated embodiment, equivalent alterations and modifications will occur to others skilled in the art upon reading and understanding the specification and the annexed drawings. In particular regard to the various functions performed by the above described and numbered elements (components, assemblies, devices, compositions, etc.), the terms (including a reference to a "means") used to describe such elements are intended to correspond, unless otherwise indicated, to any element which performs the specified function (i.e., that is functionally equivalent), even though not structurally equivalent to the disclosed structure which performs the function in the herein illustrated embodiment of the invention.

What is claimed is:

1. A remote wastegate for a turbocharged internal combustion engine system, comprising
    a housing having a passage defining a path for the flow of exhaust gases from an inlet end of the passage to an outlet end of the passage, and a swing gate pivotally mounted in the passage for movement between a closed position that blocks the flow of exhaust gases through the passage and an open position that allows the flow of exhaust gases through the passage, wherein the housing further includes a recess in the passage into which the swing gate is at least partially received in the open position to allow an unrestricted flow of exhaust gases through the passage, further comprising an actuator connected to the wastegate housing for controlling the movement of the swing gate, and wherein the swing gate seats perpendicular to the inlet end of the passage in the closed position.

2. A remote wastegate as set forth in claim 1, wherein when the swing gate is in the open position, a cross-sectional area of the flow path through the passage in the housing is substantially constant.

3. A remote wastegate as set forth in claim 1, wherein the actuator includes a control rod connected to the swing gate to move the swing gate between the open and closed positions.

4. A remote wastegate as set forth in claim 3, wherein the control rod generally acts in a direction aligned with at least a portion of the passage through the valve housing.

5. A remote wastegate as set forth in claim 3, wherein the control rod is connected to the swing gate with a pin and slot slider arrangement.

6. A remote wastegate as set forth in claim 1, wherein the valve housing defines a ninety degree angle in the flow path.

7. A remote wastegate as set forth in claim 1, wherein the swing gate has a pivot point that lies outside the flow path.

8. A remote wastegate as set forth in claim 1, wherein the actuator further includes means for varying the installed spring length of the spring.

9. A kit for retrofitting a turbocharged engine system, comprising a wastegate as set forth in claim 1, and at least one section of conduit for making a bypass path to divert exhaust gases around the turbocharger.

10. A remote wastegate for a turbocharged internal combustion engine system, comprising a housing having a passage defining a path for the flow of exhaust gases from an inlet end of the passage to an outlet end of the passage, the passage including first and second legs through the housing, a swing gate pivotally mounted in the passage for movement between a closed position that blocks the flow of exhaust gases through the passage and an open position that allows the flow of exhaust gases through the passage, the housing including an actuator mounted for movement parallel to one of the legs, and wherein the swing gate includes a sealing surface that mates with a seat that circumscribes the one leg when in the closed position, and a recess in the passage receives at least a part of the swing gate when the swing gate is in the fully open position, and wherein when in the open position the sealing surface of the swing gate lies in a plane transverse to both legs of the valve housing.

11. A remote wastegate as set forth in claim 10, wherein the housing forms approximately a ninety-degree angle between the legs.

12. A remote wastegate as set forth in claim 10, wherein when the wastegate is in the open position, it forms an angle of approximately forty-five degrees relative to at least one of the legs.

* * * * *